July 22, 1958 K. C. JORDAN 2,844,639
THERMO-ELECTRIC GENERATOR
Filed Oct. 20, 1955
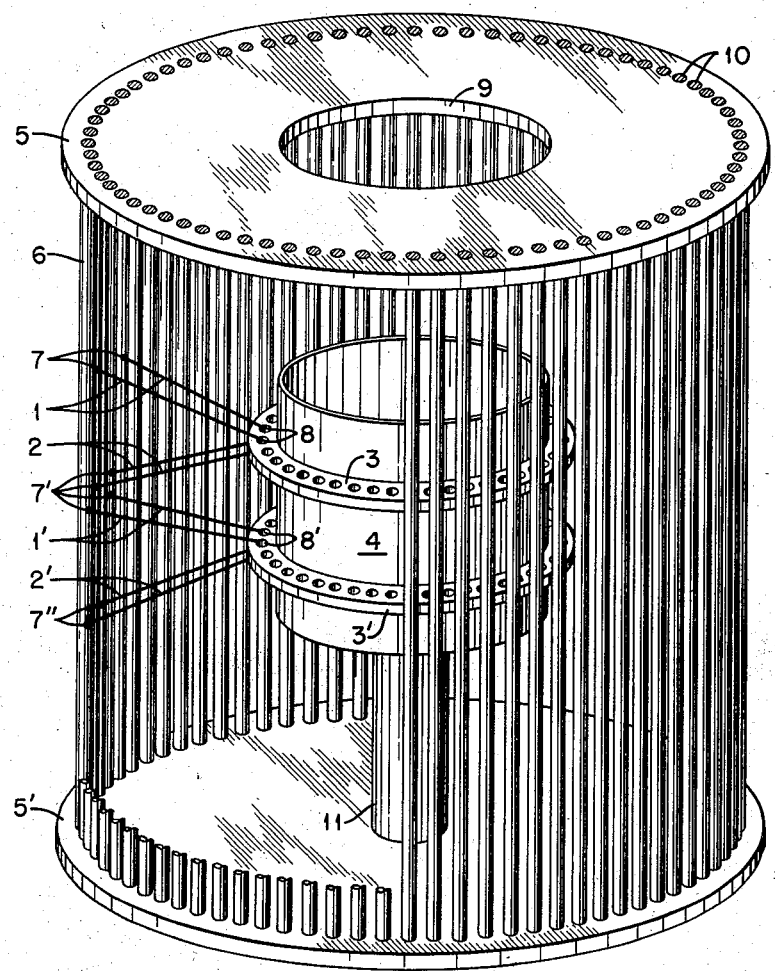
Fig-1-
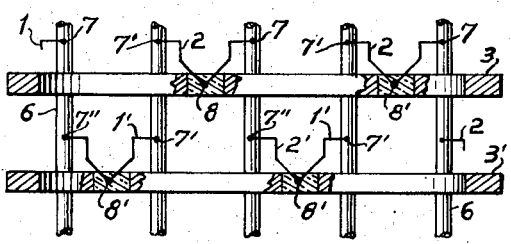
Fig-2-
INVENTOR.
BY Kenneth C. Jordan
ATTORNEY

United States Patent Office 2,844,639
Patented July 22, 1958

2,844,639

THERMO-ELECTRIC GENERATOR

Kenneth C. Jordan, Dayton, Ohio, assignor to the United States of America as represented by the United States Atomic Energy Commission Application October 20, 1955, Serial No. 541,865

4 Claims. (Cl. 136—4)

The present invention relates to a thermo-electric generator, and more especially to an improved device for more efficiently converting thermal energy into electrical energy.

A calorimeter is one example of a thermo-electric generator, and is an instrument which produces an electrical signal proportional to the heat produced in a sample chamber. Some calorimeters utilize the change in electrical resistance with temperature of a resistance thermometer, which is coupled to a bridge circuit provided with a self-balancing galvanometer, to measure the heat given up by a reaction under study.

A second type of known thermo-electric generator is the radioactive battery described in co-pending application S. N. 499,543(48), filed April 5, 1955. In the invention there described, electrical energy is generated by converting the energy of radioactive decay to heat energy and then further converting the heat energy to electrical energy. A radioactive source is sealed inside a suitable container which is placed in thermal contact with the hot junctions of a thermopile. The cold junctions of the thermopile are thermally insulated from the hot junctions and from the inner container and are brought out at one or both ends of the battery for cooling.

One serious deficiency in all radioactive batteries of the prior art is the relatively low efficiency with which the energy of radioactive decay is converted into electrical energy. One cause for this low efficiency is the lack of cooling area of the cold junctions, while another is the poor thermal contact between hot junctions and the heat source container. Even in the most advanced currently-reported batteries, this efficiency has been well below 1%. It is well recognized that the number of uses for such batteries is severely limited by such poor efficiency, since an ideal battery would give a large current or voltage, yet would be small, long lasting, and would require a relatively small quantity of a radioactive isotope. A companion problem in calorimetry is that of efficiency. Especially in micro-calorimetry, where extremely small amounts of heat from minute samples must be measured very accurately, high conversion efficiency is paramount. The reliability, ruggedness, ease of assembly, and ease of loading also influence markedly the usefulness of both the radioactive battery and the calorimeter.

With a knowledge of the foregoing and other shortcomings of the thermo-electric generators known to those working in the art, I have as a primary object of my invention the provision of a device characterized by its unusually high efficiency in converting thermal energy to useful electrical energy. A further object of my invention is to provide a thermo-electric generator characterized by relatively high efficiency, ruggedness, and ease of assembly. A further object of the invention is to provide an improved radioactive battery which can be completely assembled without the source of radioactivity being in place, so as to eliminate radiation hazards to personnel assembling the battery. These and other objects and advantages of my invention will become apparent from the following description of a preferred embodiment thereof, when read in connection with the appended drawings, in which:

Figure 1 is a partial cut-away perspective view of a preferred form of generator, and Figure 2 illustrates the novel arrangement of thermocouple wires mounted on the inner rings and the outer rods.

According to my invention, a thermo-electric generator of novel design and improved construction is provided in such manner that there is established and maintained a greater temperature difference between the hot and cold junctions of thermopile than in similar generators of the prior art. The temperature of the hot junction is raised by providing excellent thermal contact between each of the junctions and the heat source container, while the temperature of the cold junctions is lowered by providing large heat transfer surfaces as an integral part of the cold junctions themselves, which heat transfer surfaces also form structural supports for the generator. The device is so constructed that the heat source may be inserted and withdrawn at will, after assembly of the remainder of the device, without substantial radiation hazard to personnel due to long exposure.

Referring now to Figure 1, a cylindrical heat source cup or container 4 is provided with a pair of circumferential rings 3, 3' about its periphery. The rings may form an integral part of the container or may be press fit tightly thereabout to make excellent thermal contact with the cylinder, and are provided with a plurality of spaced apertures through which thermocouple wires are threaded. The rings should be formed from a relatively good thermally-conductive metal which can also be oxidized sufficiently to insulate the thermojunctions in the apertures electrically from the rings. Anodized aluminum and nickel exposed for an hour or more at 1100° C. in an oxidizing atmosphere will form excellent low voltage insulators such as are required for the rings. Aluminum is preferred for generators operating below 600° C., while for higher temperatures nickel is suitable. The apertures in the ring should be only slightly larger in diameter than the hot junctions 8, 8', which are held in place mechanically by an electrically insulating but thermally conductive material such as Sauereisen cement, which is a liquid porcelain cement available from the Sauereisen Cements Company, Pittsburgh 15, Pennsylvania. Any ceramic cement having adequate electrical and thermal properties is equally suitable. The cylindrical container 4 should be formed from a non-oxidizing metal having a low emissivity, or should be plated with a non-oxidizing metal. The container receives the heat source, which may be inserted through aperture 9 directly above it. Where a radioactive source is used, container 4 is preferably sized so that the sealed source will just slip into the container to provide good thermal contact between the source and the container.

Plates 5, 5' may be circular, formed from an electrical insulating material, and provided with a ring of apertures 10 near their outer circumferences for receiving opposite ends of the rods 6. The rods should be good electrical conductors, preferably copper or silver. They serve several functions: as structural members, spacing the plates 5, 5' apart; as conductive members, forming an integral part of the cold junctions of the thermocouples; as heat radiators, maintaining the maximum temperature differential between hot and cold junctions by providing a large cooling area for the cold junctions; and as a means for connecting the thermojunctions in electrical series relationship to form a thermopile.

Use of these spacer rods 6 in forming the cold junctions and in providing means for connecting the thermocouples electrically in series is illustrated in Figure 2, which shows schematically a group of rods 6 and the wires attached thereto. The hot junctions 8, 8' may be seen mounted on the rings 3, 3'. Leads of one kind of thermocouple wire such as iron, are numbered 1, 1', while leads of the second type of thermocouple wire, which may be constantan, are numbered 2, 2'. A wire 1 and a wire 2 form a hot junction at 8, while opposite ends of these wires are fastened respectively to rods adjacent one another. In like manner, a wire 1' joins a wire 2' at hot junction 8', with opposite ends of these wires being fastened to respective adjacent rods at points 7', 7''.

It may be seen that in the embodiment shown, utilizing two circumferential rings, the "cold junction" is not actually located any given point along the rod, but rather comprises the junction of the wire 1 or 1' with the rod, a length of the rod, and the junction of the wire 2 or 2' with the rod, so that the rods form an integral part of the cold junctions. The thermo-electric power of the junction is not affected by having this portion of the rod separating the two types of wire. The rods are further used to carry out the series electrical connection of the thermocouples. This series connection may be traced from a junction 7 through wire 1 to a junction 8, through wire 2 to junction 7', along a rod 6 to the junction of wire 1' with that rod, along wire 1' to a junction 8', and along the wire of type 2 to junction 7'', along the corresponding rod to the junction of wire of type 1 with that rod, then along wire 1 back to another junction, and so forth. Thus the consecutive rods spaced around in a cylindrical configuration form, together with the central, spaced-apart equatorial rings, a unique natural path for construction of a thermopile.

Radioactive batteries of the prior art could not be easily mass produced because of the inherent radiation danger to personnel in fastening the hot junctions to the source, then fastening the cold junctions to the end of the container. In the present invention, however, the entire generator can be assembled in complete freedom from radioactive radiation, then after assembly the source can be admitted through aperture 9 into the container, a lid press fit over the top of the cylinder 4 if desired, and a closure member applied ot the aperture 9, if desired. This operation takes only seconds and is adaptable to remote handling by tongs, so that no radiation hazard to personnel is encountered.

The entire generator may be assembled very simply as follows: the hot junctions of the several thermocouples are formed and inserted in the apertures of the circumferential rings, then cemented in place with Sauereisen cement. The container and thermocouples can then be positioned between the end plates. One conducting support rod may then be inserted between the end plates. One of the thermocouple leads 1 from the upper ring may be silver-soldered to the upper portion of the support rods. A lead of the opposite type of wire may be soldered to the same rod directly below the first soldered joint, this lead being connected to a hot junction carried in the lower ring. A second rod is then inserted adjacent to the first one. Again both types of wire, one from each circumferential ring, are silver-soldered to the rod, this time at two points nearly midway between the planes of the rings 3. The next rod is inserted and two leads soldered thereto at points above and below the planes of the rings 3 to form the series connections shown in Figure 2. The final two support rods inserted will each have only a single lead soldered thereto, and the free ends of the remaining thermocouple leads form the output terminals of the generator.

When the generator is employed as a radioactive battery, sealed sources of polonium-210 or strontium-90, available from the U. S. Atomic Energy Commission, are preferred. Those isotopes require a minimum of shielding, so that there should be no radioactive hazard from use of the battery. Moreover, those isotopes are most suitable from a cost per curie standpoint.

Many other uses for my novel apparatus will suggest themselves to those skilled in the art when faced with the problems of converting thermal energy to electrical current, or alternating current to direct current. For example, an electric heater may be placed inside the container 4 and heated with a source of alternating current. Then the output from the generator is a direct current, free from ripple. The thermal generator output voltage is also insensitive to ambient temperature changes, is useful at lower and much higher temperatures than devices incorporating semi-conductor reactifiers, and also is useful in strong radiation fields which destroy semi-conductors or change their characteristics rapidly.

While the container is preferably cylindrical, a spherical container may also be used. A single equatorial ring is preferably used with a spherical surface, but a plurality of rings, having proper contour of the contacting surfaces to provide excellent thermal conductivity and a stable, rigid structure, may also be used. Tension members may be employed between the rings to insure close physical contact with the sphere. A plurality of annular ring members may be used about the cylindrical container, the two shown being only one embodiment of the invention. The number of rings will depend upon the number of thermojunctions required, as will the number of the cold junction rods. Where more junctions are required than can be provided with a single cylindrical ring of rods, one or more insulating rings may be provided and the rods stacked vertically in complete cylindrical rings. For example, if four annular rings are provided around the cylinder 4 to receive the hot junctions, an insulating ring could be provided midway between end plates 5, 5' and the bars 6 formed only one-half their present length. The insulating ring would prevent electrical contact between the bars extending to the upper end plate and those extending to the lower end plate, so that the series connection of the thermojunctions can be made in the manner above described. These rods may be coated on their inner surfaces so that they are highly reflective to infrared radiation, as by plating with gold, while the outer surfaces may be coated with a substance such as colloidal graphite, to make them efficient radiators of infrared radiation, to further improve the efficiency of the generator.

Having described my invention, what is claimed as novel is:

1. Apparatus for converting thermal energy from a source into electrical energy comprising: a thermally conductive container for receiving said source, at least one annular member disposed about said container in thermal contact therewith and provided with a plurality of spaced apertures for receiving thermojunctions, a thermopile comprising a plurality of thermocouples provided with hot and cold junctons connected in electrical series relationship, respective hot junctions being disposed in corresponding apertures in thermal contact with but electrically insulated from said annular member, first and second electrical insulator end members disposed in spaced relationship on opposite sides of said container, a plurality of electrically conducting spacer members disposed between said end members and about said container, each of said cold junctions including part of a corresponnding spacer members, and means coupled to a first and second of said spacer members to derive an output signal therefrom.

2. Apparatus for generating electrical energy from a source of heat energy, comprising: a thermally conductive container disposed about said source and provided with at least one annular member in thermal contact therewith, said annular member being provided with a plurality of spaced apertures, first and second electrical insulator plates, a plurality of electrically conductive spacer rods conected to said plates in cylindrical configuration about said container, and a plurality of thermocouple wires of two groups, a group of hot thermojunctions, one in each of said apertures, each of said hot junctions consisting of a wire from each of said two groups, means for electrically insulating said hot junctions from said annular member, and means forming a group of cold junctions on said spacer rods, a wire from each of said two groups terminating on each rod.

3. A calorimeter for receiving a source of heat to be measured comprising: a thermally conductive container for said source provided with at least one annular member in thermal contact with the periphery thereof, said annular member being provided with a plurality of spaced apertures, a cylindrical housing for said container comprising first and second end plates and a plurality of electrically conducting rods connected to said end plates to form a cylindrical radiator, means for electrically insulating said bars in said end plates, a plurality of thermocouples connected in electrical series relationship and provided with hot and cold junctions, said hot junctions being disposed in separate apertures in said annular member and electrically insulated therefrom and said cold junctions being formed on respective spacer rods, opposite ends of the thermocouple wires forming each hot junction being connected to adjacent spacer rods, and means for deriving an output signal from a first and second of said rods.

4. Thermo-electric generator apparatus for generating electricity from a source of heat comprising: a thermally conductive container for receiving said source, said container being provided with first and second annular rings in thermal contact therewith, each ring being provided with a plurality of spaced apertures therein for receiving thermocouple junctions, an outer envelope member comprising a pair of end plates and a plurality of rods connected between said plates in cylindrical configuration about said container, said rods being electrically conductive and said end plates being electrical insulators, a first of said plates being provided with an aperture for admitting a heat source into said container, and means forming a thermopile provided with hot and cold junctions connected in electrical series relationship comprising first and second groups of thermocouple wires, each said hot junction being disposed in one of said apertures in thermal contact therewith but electrically insulated therefrom, each said cold junction being formed from one of said rods and a wire from each of said groups connected thereto.

References Cited in the file of this patent

UNITED STATES PATENTS

| | | |
|---|---|---|
| 434,500 | Cox | Aug. 19, 1890 |
| 2,126,656 | Pack | Aug. 9, 1938 |
| 2,253,771 | Dulaney | Aug. 26, 1941 |
| 2,480,404 | Findley | Aug. 30, 1949 |
| 2,579,994 | Zinn | Dec. 25, 1951 |

FOREIGN PATENTS

RCA Atomic Battery, Radio Corporation of America, 1954, pages 3, 7 and 10.

Chemical and Engineering News, vol. 32, No. 42, October 18, 1954, pages 4183–4184.